(12) United States Patent
Miyauchi

(10) Patent No.: US 8,155,810 B2
(45) Date of Patent: Apr. 10, 2012

(54) TRAIN INFORMATION MANAGEMENT DEVICE

(75) Inventor: Takashi Miyauchi, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 102 days.

(21) Appl. No.: 12/746,307

(22) PCT Filed: Dec. 1, 2008

(86) PCT No.: PCT/JP2008/071815
§ 371 (c)(1),
(2), (4) Date: Jun. 4, 2010

(87) PCT Pub. No.: WO2009/072473
PCT Pub. Date: Jun. 11, 2009

(65) Prior Publication Data
US 2010/0280683 A1    Nov. 4, 2010

(30) Foreign Application Priority Data
Dec. 6, 2007   (JP) .................................. 2007-316220

(51) Int. Cl.
*G05D 1/00* (2006.01)

(52) U.S. Cl. .......................................... 701/20; 701/19
(58) Field of Classification Search ............... 701/19–20
See application file for complete search history.

(56) References Cited

U.S. PATENT DOCUMENTS

| 5,833,325 A * | 11/1998 | Hart .................................. 303/7 |
| 6,050,650 A * | 4/2000 | Hart ................................ 303/15 |
| 6,217,130 B1 * | 4/2001 | Engle ........................... 303/22.2 |
| 2008/0288192 A1 * | 11/2008 | Kumar et al. .................. 702/60 |
| 2008/0306641 A1 * | 12/2008 | Matusiak et al. ............... 701/19 |

FOREIGN PATENT DOCUMENTS

| JP | 61-114303 A | 6/1986 |
| JP | 64-88802 A | 4/1989 |
| JP | 2001-157316 A | 6/2001 |
| JP | 2001-286009 A | 10/2001 |
| JP | 2004-224151 A | 8/2004 |
| JP | 2004-364437 A | 12/2004 |

OTHER PUBLICATIONS

International Search Report for PCT/JP2008/071815 completed Feb. 10, 2009.

* cited by examiner

*Primary Examiner* — Hussein A. Elchanti
(74) *Attorney, Agent, or Firm* — Buchanan Ingersoll & Rooney PC

(57) ABSTRACT

It is an object to provide a train information management system that performs high-order priority processing of brake commands without using a relay, and that achieves improved redundancy, enables high-speed processing, and achieves high reliability with a simple configuration. For that, by performing high-order priority processing of brake notches that are created by an ATC system, an automatic train stop, and a manual braking device without using a relay, but by performing comparison processing based on logic by a train information management system, the improved redundancy, the high-speed processing, and the high reliability are achieved.

2 Claims, 4 Drawing Sheets

TRAIN INFORMATION MANAGEMENT DEVICE

TECHNICAL FIELD

The present invention relates to a train information management device that performs high-order priority processing of brake command information output from a train safety control device and the like, and selects a brake command to output the command.

BACKGROUND ART

An automatic train control (ATC) system has conventionally been known in which an on-train device makes a deceleration pattern based on information on distance from a preceding train to a next train detected by a ground device, and that controls braking of the train according to this deceleration pattern.

An ATC system described in Patent Document 1 has three processing units each of which performs the same processing in parallel and outputs a brake notch, and a common unit that compares the brake notches output from these three processing units to determine a brake notch. The brake notch includes three types of brakes, normal braking, emergency braking, and brake ease, and stepwise notch numbers for normal braking. The common unit is configured to first make a selection from among the brake types output from the three processing units based on majority rule, and then, to select the largest notch number (that is, high-order priority) when normal braking is selected, and select emergency braking when a brake type cannot be selected. Regarding selection based on majority rule, when at least two out of three brake types created by the respective processing units match, the brake type is selected to be output, and when there is no match, it is determined that a brake type cannot be selected.

Patent Document 1 Japanese Patent Laid-open Publication No. 2001-157316

DISCLOSURE OF INVENTION

Problem to be Solved by the Invention

However, the above conventional technique has problems described below.

In the ATC system described in Patent Document 1, when the common unit goes out of order, a brake command cannot be output to a braking device, resulting in a system failure. Therefore, the redundancy is degraded and the reliability is deteriorated.

Moreover, although in the common unit, the output is determined by making a selection from among inputs from the three processing units based on majority rule, when the distance from a preceding train is short and the train is rapidly decelerated, for example, inputs from the respective processing units cannot be synchronized, and the outputs of the respective processing units can be inconsistent. In such a case, emergency braking is activated to stop the train even though no system failure has occurred, and the reliability is deteriorated.

Furthermore, because the processing units are limited to the triple system, inputs to the common unit are also limited to three, and other inputs are not supported.

Moreover, in addition to the ATC system, when other devices (for example, an automatic train stop, a manual braking device, and the like) that output a brake command are to be added, an upper-stage common unit to perform comparison processing on outputs from the respective devices is further required. Therefore, the number of common units increases, and need for maintenance increases to lead to high cost. In addition, the train weight increases and a larger braking force is to be required.

Furthermore, conventionally, there has been a case where a relay is used for high-order priority processing in the common unit. In this case, it takes time for comparison processing, and maintenance of the relay itself is to be required.

Recently, a train information management device that monitors an on-board device to collect car information and that controls and manages operation of the train comprehensively is used, and as a higher level system of ATC system and the like, management of a brake command and the like is also performed.

The present invention is achieved in view of the above problems, and it is an object of the present invention to provide a train information management device that performs high-order priority processing of brake commands without using a relay, that has a simple configuration, that has improved redundancy, that can perform high-speed processing, and that achieves high reliability.

In order to solve the above problem, and in order to attain the above object, in a train information management device that is equipped on each car of a train, that monitors on-board devices, and that collects car information to control and manage operation of the train, and that selects a brake notch to be output to a brake control device from among a plurality of brake notches output from a plurality of brake-notch creating devices each of which includes a first and a second processing units that are independent of each other, the train information management device of the present invention includes a first comparison processing unit to which brake notches created by the first and the second processing units in each of the brake-notch creating devices, that performs comparison processing on all of the input brake notches based on software processing, and that determines and outputs a brake notch producing a largest brake force; a second comparison processing unit to which brake notches created by the first and the second processing units in each of the brake-notch creating devices, that performs comparison processing on all of the input brake notches based on software processing independently of the first comparison processing unit, and that determines a brake notch producing a largest brake force; the second comparison processing unit determines whether an output from the first comparison processing unit is available, and outputs the determined brake notch to the brake control device only when an output from the first comparison processing unit is not available, and a selection switching unit that performs such processing of selecting the brake notch output from the first comparison processing unit by a switching control of the second comparison processing unit to output to the brake control device when an output from the first comparison processing unit is available, and of selecting the brake notch from the second comparison processing unit by a switching control of the second comparison processing unit to output to the brake control device when no output from the first comparison processing unit is available, based on software processing. The second comparison processing unit monitors an output from the selection switching unit to the brake control device, and only when there is no output thereto, outputs a control signal to an emergency braking unit to output an emergency brake command from the emergency braking unit to the brake control device.

Effect of the Invention

According to the present invention, because the train information management device is configured in a double system having system I and system II, when there is no output from one, output from the other can be used, and the redundancy is improved, and the reliability is high. Moreover, the number of the comparison processing units is two, and the configuration is simplified compared to the conventional technique.

Moreover, in the present invention, the comparison processing is achieved by software processing, and hardware such as a relay is not necessary to be used as the conventional technique. Therefore, parts for maintenance are not required and costs are reduced. In addition, a failure rate is low and the reliability is improved.

Furthermore, because hardware such as a relay is not required to be used, the weight of railcar is reduced, and a required brake force is less.

Moreover, in the present invention, because the comparison processing is executed by software logic, the comparison processing is simplified and high-speed processing is possible.

Figure 1:
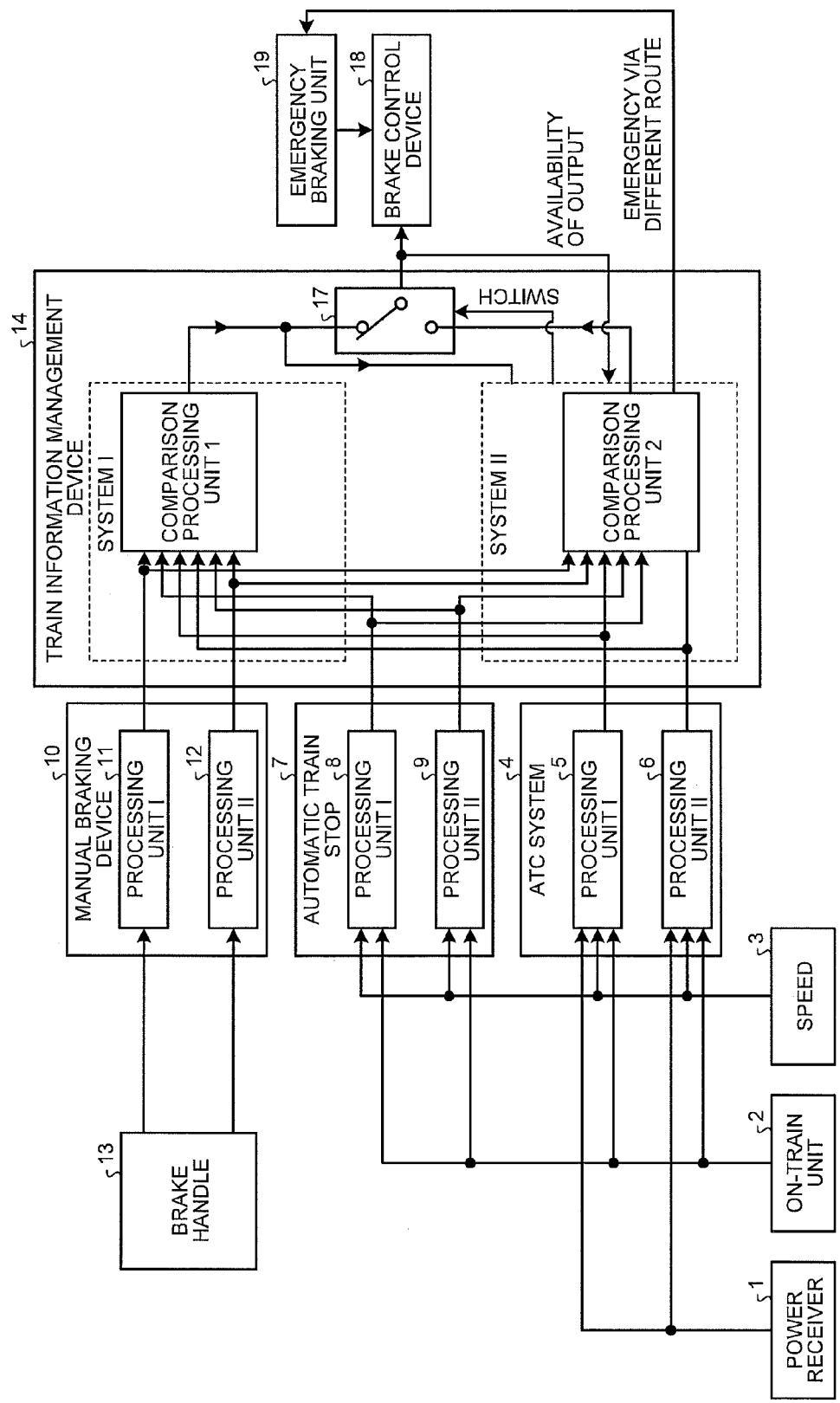
FIG. 1 is a control block diagram including a train information management device according to an embodiment.

EXPLANATIONS OF LETTERS OR NUMERALS 1, 100 Power receiver
2, 101 On-train unit
3, 102 Speed
4, 103 ATC system
5, 8, 11, 104 Processing unit I
6, 9, 12, 105 Processing unit II
7, 110 Automatic train stop
10 Manual braking device
13, 118 Brake handle
14 Train information management device
17 System I-system II selecting unit
18, 108 Brake control device
19 Emergency braking unit
106 Processing unit III
107 Common unit (comparison processing)
114 Manual braking device

BEST MODE(S) FOR CARRYING OUT THE INVENTION

Embodiments of a train information management device according to the present invention are explained in detail below with reference to the accompanying drawings. The present invention is not limited by the embodiments.

In the following description, first, referring to FIG. 3 and FIG. 4, conventional techniques are explained and the problems therein are specifically explained, thereby clarifying the effects of the present embodiment.

Figure 3:
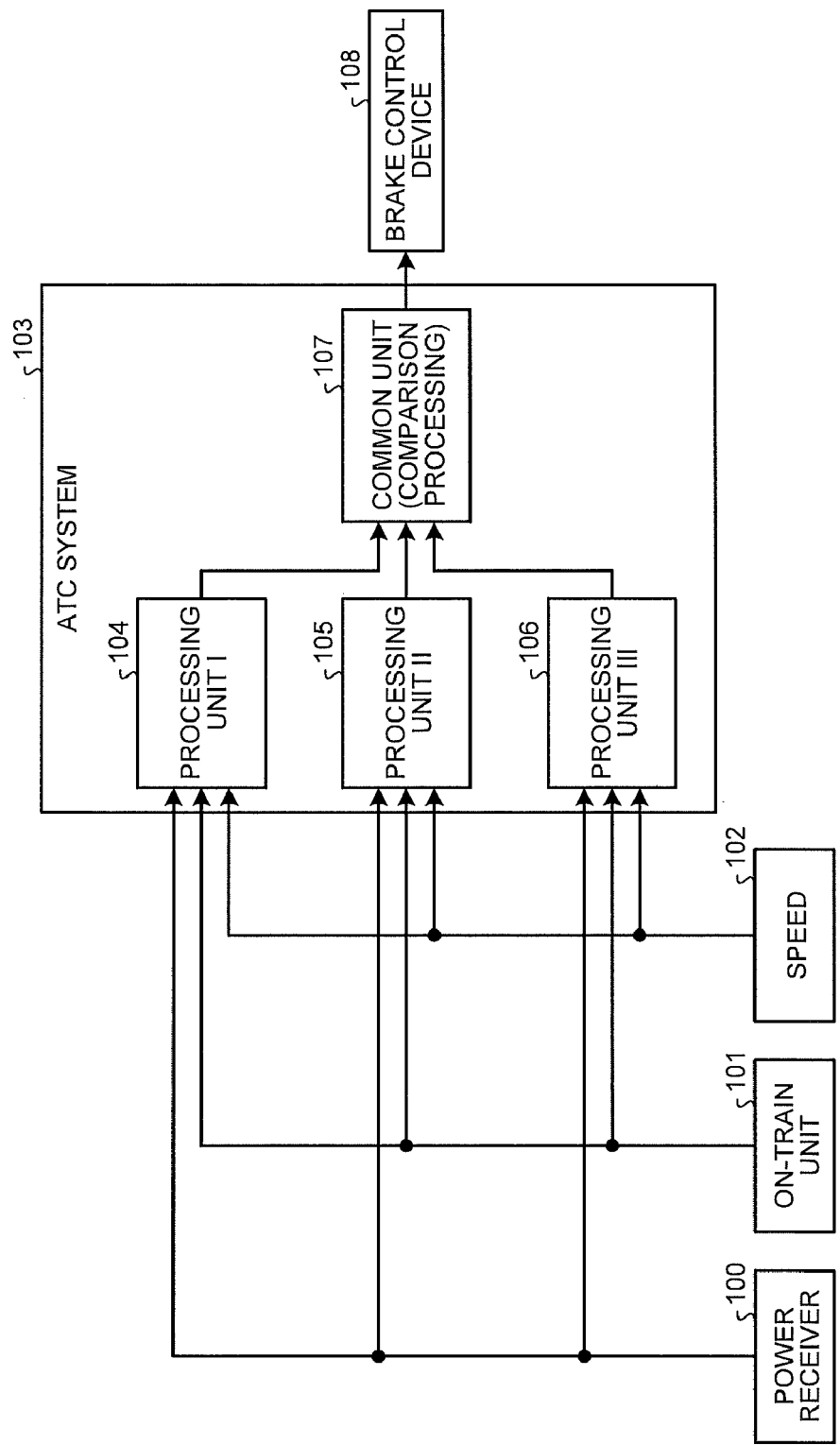
FIG. 3 is a control block diagram of an on-train device of the ATC system described in Patent Document 1.

FIG. 3 is a control block diagram of the on-train device of the ATC system described in Patent Document 1. As shown in FIG. 3, this ATC system 103 has a triple system configuration having three processing units to create brake notches in parallel. Specifically, the ATC system 103 has a processing unit I 104, a processing unit II 105, and a processing unit III 106. To each processing unit, distance-related information is input from a power receiver 100, correction information of a current position of the train is input from the on-train unit 101, and current speed 102 of the train is input from a speed detector (not shown).

In each of the processing unit I 104, the processing unit II 105, and the processing unit III 106, a brake notch is created. All of these created notches are input to a common unit 107 that performs comparison processing. In the common unit 107, when types of at least two brake notches out of the three brake notches created by the processing unit I 104, the processing unit II 105, and the processing unit III 106 match with each other, the matching brake notch is selected, and if the type is normal braking, a brake notch to be output is determined by high-order priority. The brake notch output by the common unit 107 is input to a brake control device 108, and thus, speed control of the train is performed.

In the conventional ATC system 103 as described, when a failure occurs in the common unit 107, a brake notch cannot be output to the brake control device 108, and the system goes down. In other words, because the common unit 107 is a "single system", the redundancy is low and the reliability is degraded.

Figure 4:
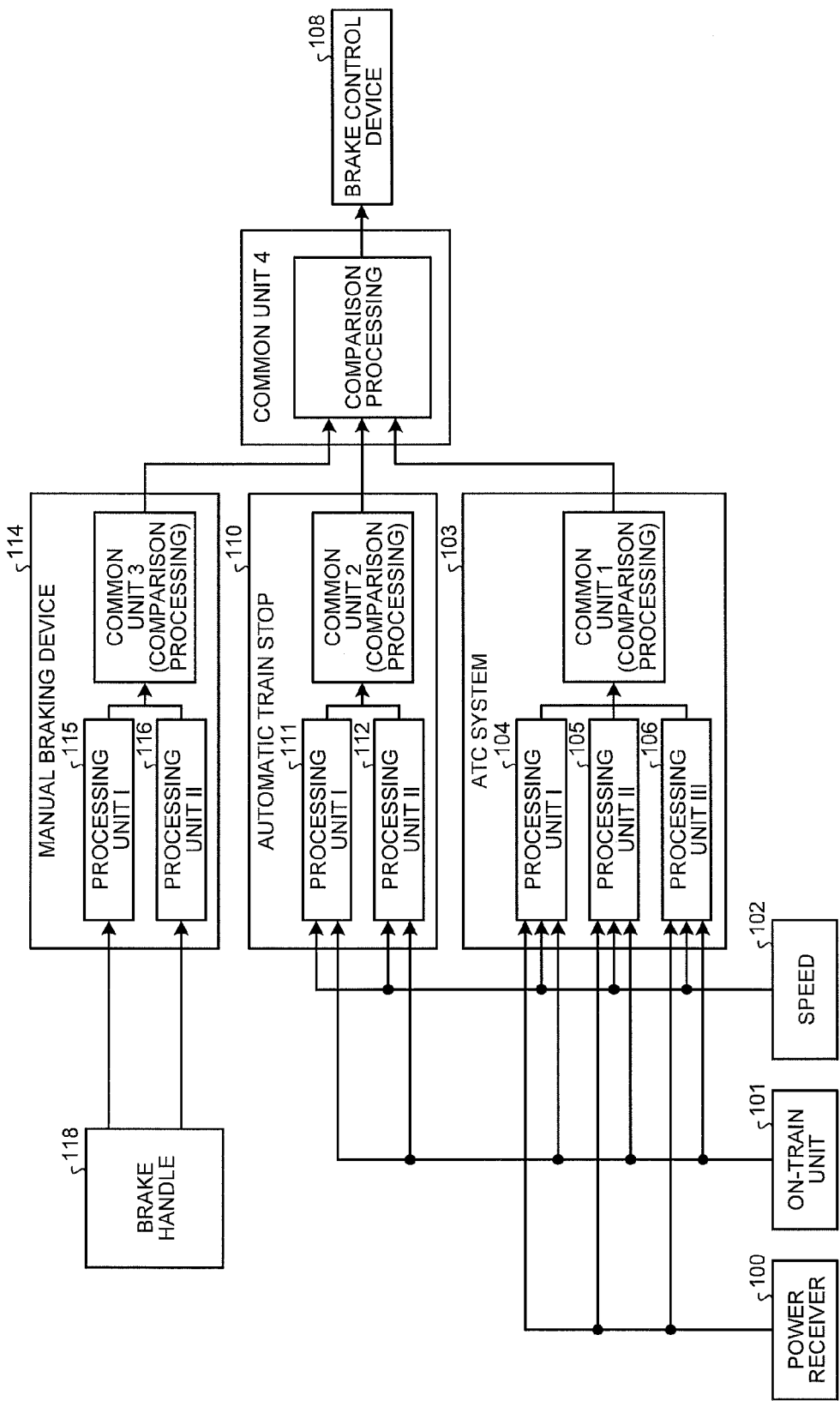
FIG. 4 is a control block diagram when the ATC device, an automatic train stop, and a manual braking device are arranged in parallel and a brake notch to be output to a brake control device is determined.

FIG. 4 is a control block diagram when the ATC device, an automatic train stop, and a manual braking device are arranged in parallel and a brake notch to be output to the brake control device is determined. That is, FIG. 4 illustrates a configuration in which, in addition to the ATC system shown in FIG. 3, an automatic train stop 110 and a manual braking device 114 that are the other devices that output a brake notch are added.

As shown in FIG. 4, the configuration of the ATC system 103 is the same as that shown in FIG. 3, and the ATC system 103 includes the processing unit I 104, the processing unit II 105, the processing unit III 106, and a common unit 107 that performs comparison processing. Moreover, to each processing unit of the ATC system 103, distance-related information is input from the power receiver 100, correction information of a current position of the train is input from the on-train unit 101, and the current speed 102 of the train is input from the speed detector (not shown).

Similarly to the case shown in FIG. 3, all brake notches created by the processing unit I 104, the processing unit II 105, and the processing unit III 106 are input to the common unit 107, and a brake notch is determined in the common unit 107. The brake notch determined by the common unit 107 is output to a common unit 119 that performs higher level comparison processing.

The automatic train stop 110 includes a processing unit I 111, a processing unit II 112, and a common unit 113 that performs comparison processing. Furthermore, to each processing unit of the automatic train stop 110, correction information of a current position of the train is input from the on-train unit 101, and the current speed 102 is input from the speed detector (not shown).

In each of the processing unit I 111 and the processing unit II 112, a brake notch is created. These created brake notches are all input to the common unit 113. In the common unit 113, a brake notch to be output is determined out of the two brake notches created by the processing unit I 111 and the processing unit II 112 by high-order priority. The brake notch determined by the common unit 113 is further output to the common unit 119.

The manual braking device 114 includes a processing unit I 115, a processing unit II 116, and a common unit 117 that performs comparison processing. To each processing unit of the manual braking device 114, a manual brake command is input from a brake handle.

In each of the processing unit I 115 and the processing unit II 116, a brake notch is created. These created brake notches are all input to the common unit 117, and in the common unit 117, a brake notch to be output is determined out of the two brake notches created by the processing unit I 115 and the processing unit II 116 by high-order priority. The brake notch determined by the common unit 117 is further input to the common unit 119.

The common unit 119 performs comparison processing on the brake notches that are output from the ATC system 103, the automatic train stop 110, and the manual braking device 114, respectively, to determine a brake notch to be output by high-order priority. The brake notch output by the common unit 119 is input to the brake control device 108, to conduct speed control of the train.

As described, in the configuration shown in FIG. 4, comparison processing at higher level than the three devices is required, and therefore, the upper-stage common unit 119 is required. Because the upper-stage common unit 119 is a single system, the redundancy is low and the reliability is degraded. In addition, because four common units are provided, the number of the common units is increased, and accordingly, there are problems that the failure rate of the common units increases and parts for maintenance increase, and the like.

Embodiment

FIG. 1 is a control block diagram including a train information management device according to the present embodiment. As shown in FIG. 1, for example, three units of devices, that is, an ATC system 4, an automatic train stop 7, and a manual braking device 10, each of which creates and outputs a brake notch are provided, and the brake notches created by these three devices are input to a train information management device 14. The train information management device 14 is a system that is equipped in each car of the train, that monitors on-board devices, and that collects car information to control and manage the operation of the train comprehensively, and the present embodiment relates to brake control thereof.

The ATC system 4 includes a processing unit I 5 and a processing unit II 6, and has a processing unit of a double system. To each of the processing unit I 5 and the processing unit II 6, distance-related information is input from a power receiver 1, correction information of a current position of the train is input from an on-train unit 2, and current speed 3 of the train is input from a speed detector (not shown). The processing unit I 5 performs calculation based on the input from the power receiver 1, the input from the on-train unit 2, and the speed 3, and creates and outputs a brake notch. Similarly, the processing unit II 6 performs calculation based on the input from the power receiver 1, the input from the on-train unit 2, and the speed 3, and creates and outputs a brake notch. For the ATC system 4, the brake notch has, for example, 1- to 8-segment brakes.

The automatic train stop 7 includes a processing unit I 8 and a processing unit II 9, and has a processing unit of a double system. To each of the processing unit I 8 and the processing unit I 9, correction information of a current position of the train is input from the on-train unit 2, and current speed 3 of the train is input from the speed detector (not shown). The processing unit I 8 performs calculation based on the input from the on-train unit 2 and the speed 3, and creates and outputs a brake notch. Similarly, the processing unit II 9 performs calculation based on the input from the on-train unit 2 and the speed 3, and creates and outputs a brake notch. For the automatic train stop 7, the brake notch has, for example, 1- to 32-segment brakes.

The manual braking device 10 includes a processing unit I 11 and a processing unit II 12, and has a processing unit of a double system. To each of the processing unit I 11 and the processing unit II 12, a manual brake command is input from a brake handle 13. The processing unit I 11 performs calculation based on the input from the brake handle 13, and creates and outputs a brake notch. The processing unit II 12 performs calculation based on the input from the brake handle 13, and creates and outputs a brake notch. For the manual braking device 10, the brake notch has, for example, 1- to 8-segment brakes.

The train information management device 14 includes a comparison processing unit 15 of system I, a comparison processing unit 16 of system II, and a system I-system II selecting unit 17, and forms a double system for comparison processing.

To the comparison processing unit 15, the brake notches that are created by the processing unit I 5 and the processing unit II 6 of the ATC system 4 are input, the brake notches that are created by the processing unit I 8 and the processing unit II 9 of the automatic train stop 7 are input, and further, the brake notches that are created by the processing unit I 11 and the processing unit II 12 of the manual braking device 10 are input. That is, all of the outputs from the processing unit I and the processing unit II of the respective devices that create a brake notch are input. To the comparison processing unit 16 also, similarly to the comparison processing unit 15, all of the outputs from the processing unit I and the processing unit II of the respective devices that create a brake notch are input.

In the comparison processing unit 15, values of the input six brake notches are compared, and a largest brake notch is selected. That is, the high-order priority processing is performed. If the segment number of the brake notches differ among those of the ATC system 4, the automatic train stop 7, and the manual braking device 10, translation of the brake notches, by changing the scale from one to another or the like, is performed to execute the comparison processing. Moreover, the high-order priority processing is executed by software logic by a CPU of the train information management device 14. As described, the comparison processing unit 15 is implemented by the processing of the CPU based on software. The comparison processing unit 16 also performs the comparison processing similarly to the comparison processing unit 15, independently of the comparison processing unit 15.

The output from the comparison processing unit 15 and the output from the comparison processing unit 16 are both input to the system I-system II selecting unit 17. In the present embodiment, system I is the main system and system II is the subordinate system, and as shown in FIG. 1, as long as an output from system I is available, the system I-system II selecting unit 17 always selects the output of the comparison processing unit 15, and outputs the selected one to the brake control device 18. That is, the comparison processing unit 16 of system II is configured such that an output thereof is selected by the system I-system II selecting unit 17 to be output to the brake control device 18 only when an output from the comparison processing unit 15 of system I is not available.

The brake control device 18 performs brake control according to the brake notch output by the train information management device 14. When there is no output from the train information management device 14 due to failure of the device and the like, an emergency braking unit 19 detects this, and issues an emergency brake command to the brake control device 18. In the present embodiment, system II switches the system I-system II selecting unit 17. Furthermore, system II monitors an output to the brake control device 18, and when there is no output thereto, outputs a control signal to the emergency braking unit 19 through another route.

Figure 2:
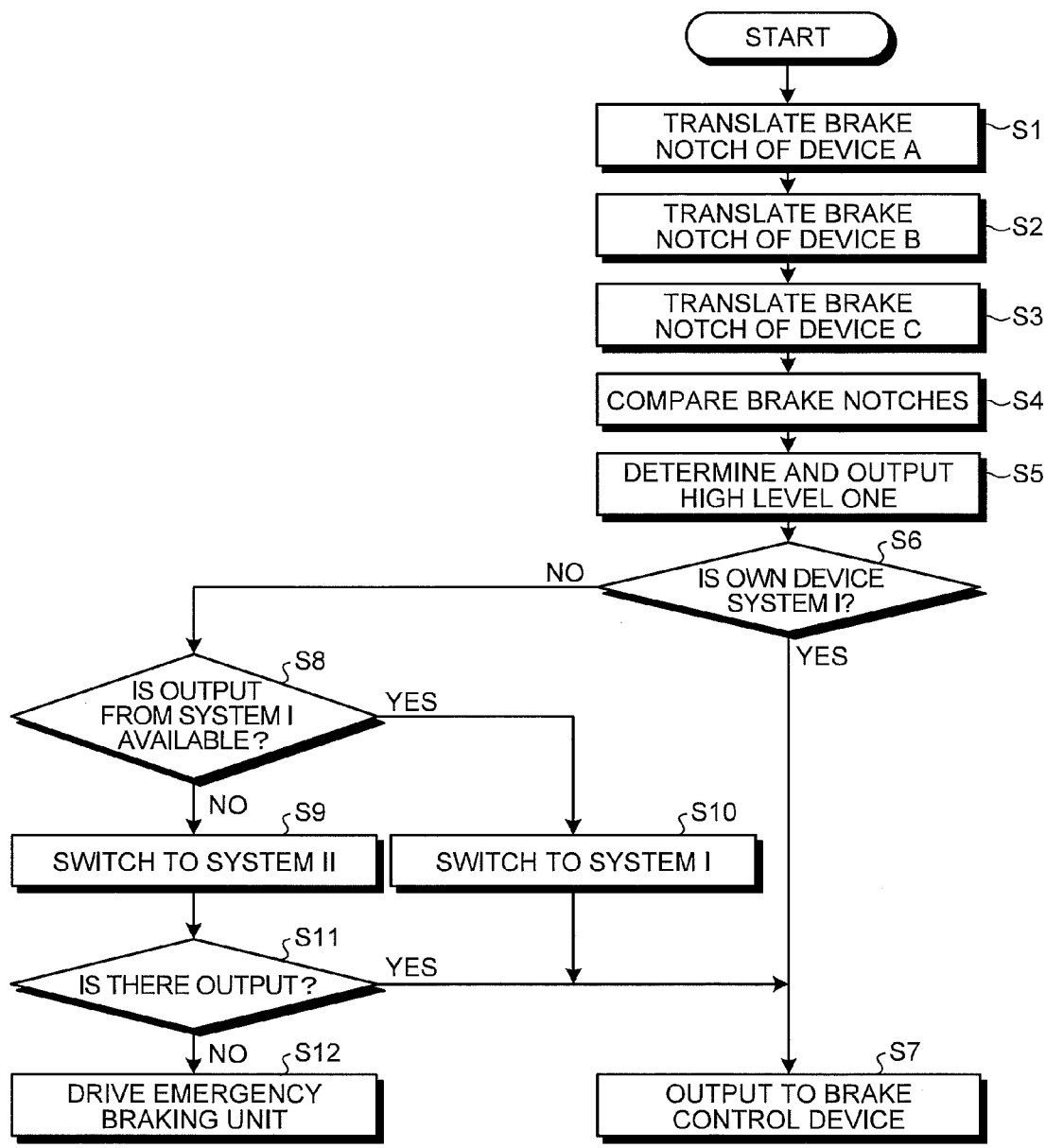
FIG. 2 is a flowchart showing brake-notch selection processing in the train information management device.

Next, referring to FIG. 2, brake-notch selection processing performed by the train information management device 14 is explained in detail. FIG. 2 is a flowchart showing the brake-notch selection processing performed by the train information management device 14.

As shown in FIG. 2, first, in either one of the comparison processing unit 15 or the comparison processing 16 that is selected by the system I-system II selecting unit 17, translation of a brake notch is performed on the brake notch input from device A to compare with brake notches input from other devices (step S1). Subsequently, translation of a brake notch is performed on the brake notch input from device B to compare with brake notches input from other devices (step S2). Furthermore, translation of a brake notch is performed on the brake notch input from device C to compare with brake notches input from other devices (step S3). The devices A, B, and C indicate the ATC system 4, the automatic train stop 7, and the manual braking device 10 in no particular order.

Next, based on the results of translation of the brake notches at steps S1 to S3, comparison of six brake notches is performed (step S4). Subsequently, by software logic, a high level brake notch producing the largest brake force is determined, and is selected to be output (step S5).

As a result of determination whether an own device is system I or system II made at step S6, if it is system I, the output thereof is output to the brake control device 18 (step S7).

As a result of the determination whether the own device is system I or system II made at step S6, if it is system II, it is determined whether an output from system I is available (step S8). When an output from system I is available, selection of the system I-system II selecting unit 17 is switched from system II to system I (step S10). When an output from system I is not available, selection of the system I-system II selecting unit 17 is switched from system I to system II (step S9). When it is switched to system II, it is determined whether there is an output to the brake control device 18 (step S11), and when there is no output thereto, the emergency braking unit 19 is driven (step S12).

According to the present embodiment, because the train information management device 14 is configured in a double system having system I and system II, when there is no output from one, an output from the other can be used, and compared to the configuration based on a single system "common unit" as shown in FIG. 3 and FIG. 4, the redundancy is improved and the reliability is high.

Moreover, while four common units that perform comparison processing are required in the configuration shown in FIG. 4 in which brake notches output from the ATC system 4, the automatic train stop 7, and the manual braking device 10 are processed similarly to FIG. 1, in the present embodiment, only the comparison processing units 15 and 16 are required and the configuration is simplified.

Furthermore, in the present embodiment, the comparison processing units 15 and 16 are implemented by software processing, and a common unit that is implemented by a relay and the like as the conventional technique is not required. Therefore, parts for maintenance are not required and costs are reduced. Further, because the common unit is not required, failure rate becomes low, and the reliability is improved.

Moreover, because a common unit that is implemented by a relay and the like is not required, the weight of a railcar is reduced, and a required brake force is less.

Furthermore, in the present embodiment, because the comparison processing is executed by software logic, the comparison processing is simplified, and high-speed processing is possible. The processing time is about 10 msec.

Although in the present embodiment, it is configured such that calculation is performed on brake notches output from three devices, the ATC system 4, the automatic train stop 7, and the manual braking device 10, by the train information management device 14, "brake-notch creating devices" that output brake notches to the train information management device 14 can be arranged in arbitrary number.

Industrial Applicability

The present invention is useful as a train information management device that performs high-order priority processing of brake command information output from a train security control device and the like, and that selects and outputs a brake command.

The invention claimed is:

1. A train information management device that is equipped on each car of a train, that monitors on-board devices, and that collects car information to control and manage operation of the train, and that selects a brake notch to be output to a brake control device from among a plurality of brake notches output from a plurality of brake-notch creating devices each of which includes a first and a second processing units that are independent of each other, the train information management device comprising:

a first comparison processing unit to which brake notches created by the first and the second processing units in each of the brake-notch creating devices, that performs comparison processing on all of the input brake notches based on software processing, and that determines and outputs a brake notch producing a largest brake force;

a second comparison processing unit to which brake notches created by the first and the second processing units in each of the brake-notch creating devices, that performs comparison processing on all of the input brake notches based on software processing independently of the first comparison processing unit, and that determines a brake notch producing a largest brake force;

the second comparison processing unit determines whether an output from the first comparison processing unit is available, and outputs the determined brake notch to the brake control device only when an output from the first comparison processing unit is not available, and a selection switching unit that performs such processing of selecting the brake notch output from the first comparison processing unit by a switching control of the second comparison processing unit to output to the brake control device when an output from the first comparison processing unit is available, and of selecting the brake notch from the second comparison processing unit by a switching control of the second comparison processing unit to output to the brake control device when no output from the first comparison processing unit is available, based on software processing, wherein the second comparison processing unit monitors an output from the selection switching unit to the brake control device, and only when there is no output thereto, outputs a control signal to an emergency braking unit to output an emergency brake command from the emergency braking unit to the brake control device.

2. The train information management device according to claim 1, wherein the brake-notch creating devices are an automatic train control system, an automatic train stop, and a manual braking device.

* * * * *